United States Patent [19]

Bartley et al.

[11] Patent Number: 4,660,130
[45] Date of Patent: Apr. 21, 1987

[54] METHOD FOR MANAGING VIRTUAL MEMORY TO SEPARATE ACTIVE AND STABLE MEMORY BLOCKS

[75] Inventors: David H. Bartley; Timothy J. McEntee, both of Dallas; Donald W. Oxley, Carrollton; Satish M. Thatte, Richardson, all of Tex.

[73] Assignee: Texas Instruments Incorporated, Dallas, Tex.

[21] Appl. No.: 634,334

[22] Filed: Jul. 24, 1984

[51] Int. Cl.[4] .............................................. G06F 12/12
[52] U.S. Cl. .................................................... 364/200
[58] Field of Search ... 364/200 MS File, 300 MS File, 364/900 MS File

[56] References Cited

PUBLICATIONS

AHO, "Data Structures and Algorithms", A-W Pub. Co., 1983, Chapter 12, pp. 378-410.

*Primary Examiner*—James D. Thomas
*Assistant Examiner*—C. H. Lynt
*Attorney, Agent, or Firm*—Kenneth C. Hill; James T. Comfort; Melvin Sharp

[57] ABSTRACT

A method for compacting blocks of memory in a demand paged virtual address space which includes a plurality of virtual address pages includes identifying active and stable blocks to be compacted by defining a pointer to indicate a page of the virtual memory space, and advancing the pointer to continually indicate the page of the beginning of the available virtual memory space. As new blocks are allocated, they are located in the virtual address space beginning at the next available location of the advancing pointer. As blocks are referenced by the user, they are moved to the current location of the advancing pointer, so that, stable blocks may be collected together on stable pages and active blocks are collected together on active pages. A disk memory is provided, and periodically the pages containing collected stable blocks are "paged-out" to it. The method improves the overall throughput of data in the memory by reducing the time waiting for disk, the time in which the CPU is delayed during frequent garbage collections, and the allocation response time. Also, the method insures efficient use of the backing store by insuring that sparsely allocated pages are not written out to disk.

11 Claims, 4 Drawing Figures

METHOD FOR MANAGING VIRTUAL MEMORY TO SEPARATE ACTIVE AND STABLE MEMORY BLOCKS

BACKGROUND OF THE INVENTION

1. Field of the Invention

This invention relates to memory systems, and more particularly, to methods for managing memory systems, and still more particularly to a method for segregating active and stable blocks for improved memory response time.

2. Background Information

The development of storage management systems has a long history with many related branches of research. Over the years, a great deal of attention has been given to the allocation and deallocation of memory structures. Many memory structures of interest are shown by Deitel, H. M., *An Introduction to Operating Systems*, Addison-Wesley, Mass., Chapter 7, 1982. Other major issues are discussed by Knuth, D., *The Art of Computer Programming*, Vol. 1: Fundamental Algorithms, Addison-Wesley, Reading, Mass., 1968. The invention herein described is concerned primarily with computer systems having heap managed memories, and is used together with or independently from a garbage collection scheme. A "heap managed" memory is one in which the memory is allocated and freed (either explicitly or implicitly) without regard to the temporal order or the size of the memory unit under consideration. A garbage collected memory is one in which usable memory is automatically reclaimed, and the memory may be reorganized from time to time to efficiently utilize the space of the memory, as needed. A survey of garbage collection techniques and related background materials is presented by Cohen, J., "Garbage Collection of Linked Data Structures", *Computing Surveys*, Vol. 13, No. 3, September, 1981, pp. 341-367. P. Bishop discusses garbage collection in very large address spaces in "Garbage Collection in a Very Large Address Space", Massachusetts Institute of Technology, Working Paper 111, September 1975.

Additionally, the overall size of a virtual memory space is often of concern, since garbage collection costs increase with the size of the space being collected, not with the amount of garbage being reclaimed.

In the operation of a typical memory system and associated central processing unit (CPU), the CPU requests the allocation of memory space as needed. Often, the allocation of the memory is done in a virtual address space. As the virtual address space becomes fully allocated, eventually requests for additional space must be denied, until reusable space in the previously allocated virtual address space has been identified and reclaimed.

As used herein, the term "physical memory" means the actual physical memory, including the main memory, usually RAM semiconductor devices, and the backing store, usually a paging disk. The term "virtual address space" is used to mean a uniform, linear, and homogeneous apparent memory space.

Generally in memory systems of the type to which the invention pertains, portions of memory are allocated in "blocks" of size specified by the CPU. Each block has a header in which various pieces of information are contained pertaining to the block, including, for example, the identification of the block, its size, and other things which may be of interest. Also contained in the block header is a field containing a reference count. The reference count of a block indicates the number of references to the block from any other block, or itself. One form of reference count is shown by Deutsch et al., "An Efficient, Incremental, Automatic Garbage Collector", *CACM*, Vol. 19, No. 9, September, 1976, pp. 522-526. In the type of memory to which the method of this invention pertains, when a block is initially allocated, it has a reference count of zero. Any time a new reference is established, the reference count is incremented. When a reference within a block is destroyed, the reference count of the target block is decremented. Except when a block is originally created, when the reference count of a block is decremented to zero, the block is considered to be garbage, and the space it occupies can be reclaimed.

In the memory management systems in the past, as blocks were allocated and deallocated, often pages containing very few blocks were paged out to disk to make room for further block allocation. As the need arose for access to the paged out blocks, usually, some additional page in the main memory would need to be paged out to make room for the page to be brought in from the disk. Then, the sparsely populated page is brought into the main memory from the disk, and the block needed used, after which it is almost immediately written back out to the disk. It can be seen that this produces a great deal of "thrashing", involving rapid, frequent disk fetch and write operations, and is undesirable since it greatly slows down memory operations.

What is needed is a method for managing a memory in which blocks are efficiently stored in a manner by which those which are infrequently needed are collected and completely stored and paged out onto disk, and blocks which are frequently used are collected and maintained in main memory for efficient access.

BRIEF DESCRIPTION OF THE INVENTION

In light of the above, it is an object of the invention to provide a method for memory management of a demand paged virtual memory which improves the overall throughput of data in the memory by reducing the time waiting for disk, and time in which the CPU is delayed during frequent garbage collections.

It is another object of the invention to provide a method of the type described in which allocation response time is improved.

It is another object of the invention to provide a method of the type described in which efficient use of the backing store is enabled by insuring that sparsely allocated pages are not written out to disk.

These and other objects, features and advantages will become apparent to those skilled in the art from the following detailed description, when read in conjunction with the accompanying drawings and appended claims.

In its broad aspect, the invention presents a method for compacting blocks of memory in a demand paged virtual address space which includes a plurality of virtual address pages. The method includes the steps of identifying active and stable blocks to be compacted by defining a pointer, N, to indicate an address of the virtual memory space and advancing the pointer, N, to continually indicate the address of the beginning of available virtual memory space. As new blocks are allocated, they are located in the virtual address space beginning at the location of the advancing pointer. Additionally, as blocks are referenced by the user, they are moved to the current location of the advancing pointer, so that, therefore, active blocks (defined below) are collected together on active pages.

In one aspect of the method of the invention, the extent of utilization of each page is determined, and blocks to which reference is made by the user are moved only if the extent of utilization of the page on which the referenced blocks are located falls below a predetermined level. Furthermore, a disk memory is provided, and periodically, the pages containing collected stable blocks are "paged-out" to it.

In accordance with still another aspect of the invention, an associative look-up table is provided into which is written the identification and location of blocks which are moved to a special page which will eventually be paged-out. Also maintained in each table entry is a reference count of each block identified therein. The associative look-up table is periodically scanned to update references to the blocks identified in it.

BRIEF DESCRIPTION OF THE DRAWINGS

The invention is illustrated in the accompanying drawing, wherein.

In the various figures of the drawing, like reference numerals are used to denote like or similar items or parts.

DETAILED DESCRIPTION OF THE PREFERRED EMBODIMENTS

On-the-fly (OTF) compaction addresses many needs for effective memory management. These include the need to improve overall throughput by reducing any time spent waiting for disk, and time in which the CPU is delayed during frequent garbage collections. Additionally, the need to improve allocation response time and the need to more effectively use the backing store by not writing out sparsely allocated pages are of concern. Finally, the need to minimize both the dynamic working set and static working set (described below) is of interest.

Figure 1:
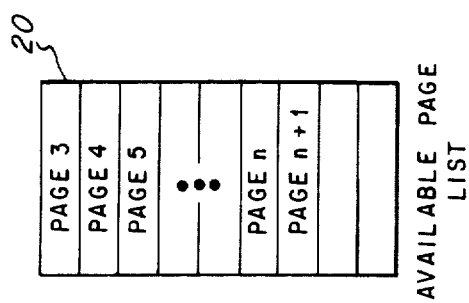
FIG. 1 is a diagrammatic illustration showing the configuration of the virtual address space of an Area X as blocks are being initially allocated thereto and showing the operation of an available page list used in conjunction therewith, in accordance with the invention.
Figure 1:
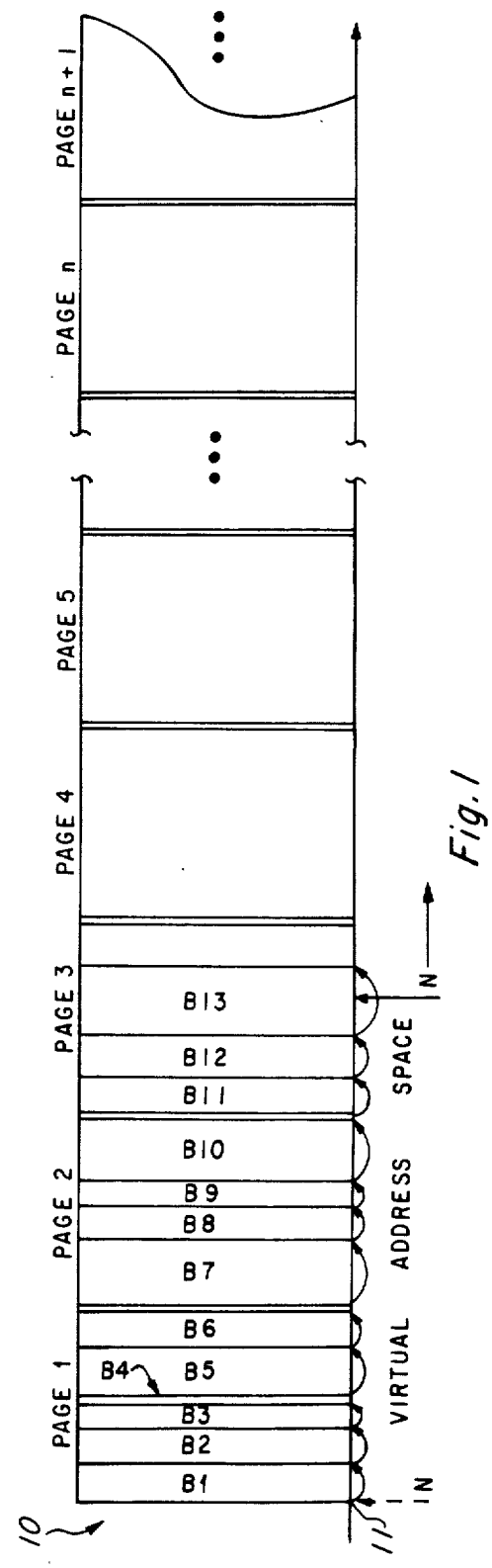

The invention is illustrated diagrammatically in FIG. 1, representing an area X (in the sense of Bishop, supra) within a virtual address space of a memory. In order to simplify the description of the concepts, OTF compaction is described with respect to a single memory area X, although it should be understood that the invention is equally applicable to memory systems which do not use areas. It should be emphasized that more than one area can be active at any given time, but operations on only one area are described herein for clarity. Ordinarily, the physical memory, backing store, and so on, contain several such areas which comprise the available resources.

The virtual address space 10 is represented by a continuous, homogeneous set of addresses beginning from an initial point 11 and continuing for the length of the area X. In general, in observing a virtual address space, three different types of blocks can be found. These are active blocks, stable blocks, and garbage blocks. An active block is one which is actively referenced by the CPU. It can be "volatile" in the sense that it may be short-lived; that is, the CPU may allocate it, use it for a short period of time, and discard it. A stable block is one which is accessible to the CPU, but which has not been needed or accessed for a relatively long period of time. A garbage block is one which is no longer accessible to the CPU, but whose reference count is not zero. A reference count of a block represents the number of references to the block from any other block or itself. When a block is initially allocated, it has a reference count of one, and whenever a new reference is established, the reference count is incremented. Any time a reference within a block is destroyed, the reference count of the target block is decremented. Reference counts are particularly useful in garbage collection procedures, and an example can be seen in coppending U.S. patent application, Ser. No. 636,187, filed July 31, 1984, entitled "Computer Memory Systems with Parallel Garbage Collection Independent from an Associated User Processor", by Oxley, et al, assigned to the assignee hereof and incorporated herein by reference as background.

One primary objective of the OTF compactor is to keep the most active blocks in physical memory. Thus, as will become apparent, stable blocks are eventually placed in the backing store, unless space is available in physical memory.

Since it may be desirable to use demand paging for the virtual memory, it would be advantageous for each page to hold blocks which are of identical type: active, stable, or garbage. Thus, the page can be selectively located in memory (all active), paged out (all stable), or reused (all garbage).

It would be ideal if, at any given point in time, the set of virtual address pages containing active blocks, referred to herein as the "dynamic working set" were smaller than the physical memory of the system. Further, it would be ideal if the set of virtual address pages containing both stable and active blocks, referred to herein as the "static working set", were as small as possible and less than the backing store of the system.

Blocks are "copied or moved forward" on certain references in order to consolidate active blocks into "active" pages. Thus, for instance, when a block is accessed for data access, for example, the block is moved forward to an active page. "Old" pages tend therefore to contain only stable and garbage blocks, and can be selectively paged out. The result is that stable blocks may be consolidated and some of the garbage blocks may be identified. It should be noted that not all garbage blocks will be identified during the paging out process. Garbage collection (GC) may be eventually required to expunge the remaining garbage blocks.

Under the normal operation of memory management, two types of events frequently occur. These are the allocation of a new block for future use by the CPU, and the reclamation of a block no longer of use to the CPU, as indicated by the fact it no longer has any references to it. Ideally, the frequency of these two events is equal. For every block reclaimed from the static working set there is a new block added to it. Thus, the size of the static working set remains relatively constant.

In the absence of garbage collection, reference counts are the only means of reclaiming discarded blocks. When a block is reclaimed because its reference count has reached zero, a portion of the virtual address page in which the block resided is freed, and, therefore, can be considered a re-usable page fragment. After several blocks are reclaimed, several page fragments may exist on several pages. If a mechanism exists to keep track of these page fragments, the fragments could be used as the locations for allocating new blocks. However, such a scheme has two major drawbacks. The locality of references of accessible blocks can become quite scattered. Blocks highly referenced and highly associative to one another could be distributed among far more virtual address pages than there are pages for physical memory. This would result in thrashing, that is, frequent paging in and paging out or disk accessing. Additionally, the scheme could hinder allocation response time.

The OTF scheme of the invention manages the allocation and removal of blocks, yet does not place new blocks in re-usable page fragments as described above. Instead, new blocks are allocated at the virtual address page pointed to by an advancing pointer, referred to herein as "N", as shown in the Figures. When a block is allocated to the page, it is placed at the next available address of the unused portion of the page. Thus, as shown in FIG. 1, blocks denoted B1-B13 are sequentially located in the virtual address space 10, each beginning from the next available address of the page pointed to by pointer N. Further, in accordance with the invention, there is no attempt to reuse portions of a page which are freed up when blocks are removed from the page. The page is considered full when all or nearly all of the page has been allocated.

Pointer N is "advancing" in the sense that, each time the page pointed to by N becomes full, N is updated to point to the next higher or larger virtual address page. When the highest virtual address page of the area becomes full, either garbage collection is invoked, or new pages for allocation are obtained from an accumulated "pool" of empty pages, as described below.

Figure 2:
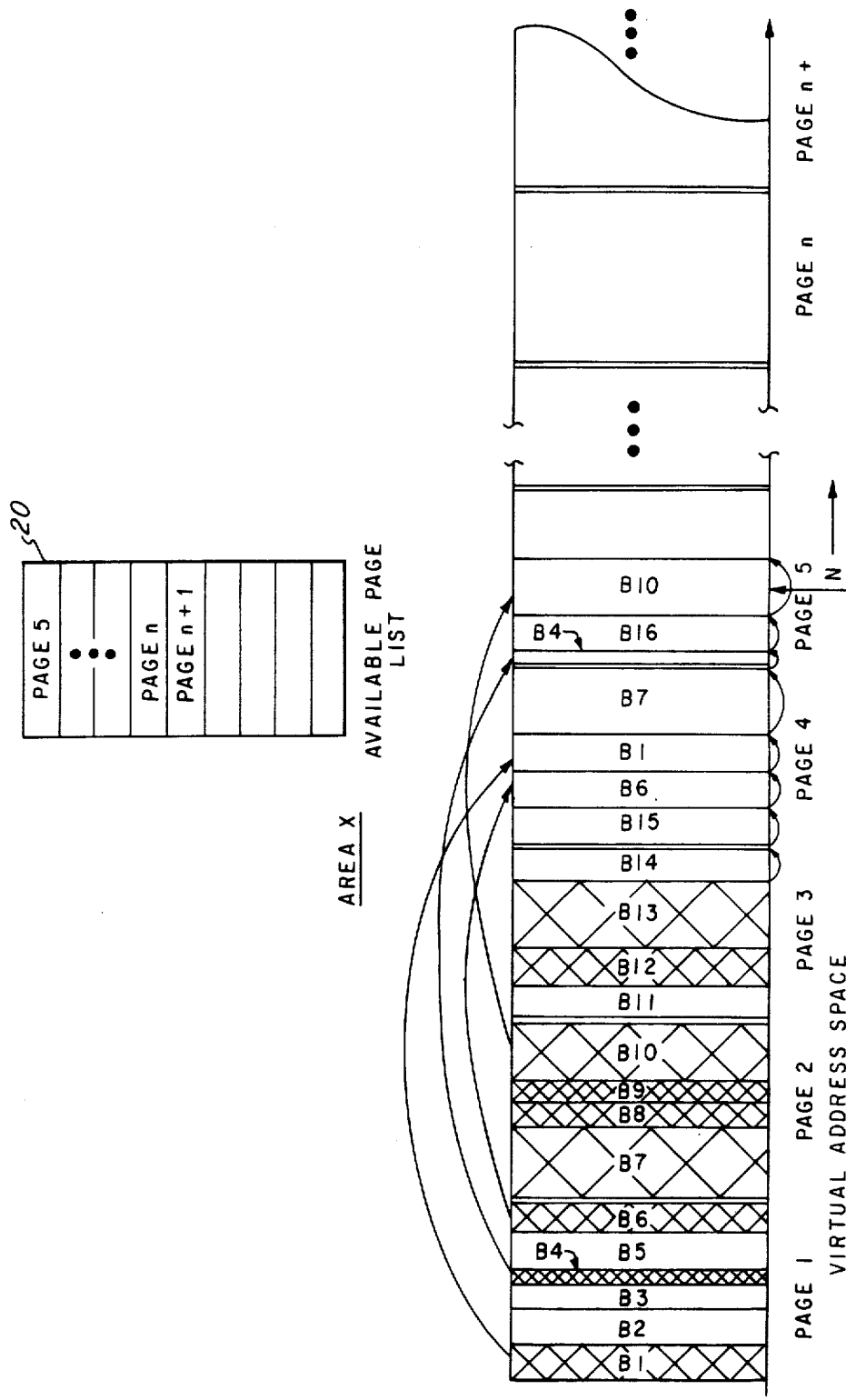
FIG. 2 is a diagrammatic view showing the virtual address space of an Area X of FIG. 1 as blocks are deallocated and referenced blocks are copied forward, and illustrating the operation of an available fragments list, all in accordance with the invention.

Allocation of blocks is only one of the frequent events which occurs in response to the CPU requests. Blocks are also being reclaimed from the pages comprising the dynamic and static working sets as their reference counts become zero. Thus, as shown in FIG. 2, during the time blocks B1-B13 have been allocated, certain blocks have also been deallocated. In the example shown, for instance, blocks B8, B9, B12, and B13 have been deallocated or reclaimed. Each time a block is reclaimed from a virtual address page, the utilization of that page decreases. To what extent a page is utilized is an important parameter which will be accurately maintained as part of the control structure of each page. When an empty virtual address page is first brought into physical memory, the percent of utilization of the page is, obviously, zero. Each time a block is allocated to the page, the percent of utilization of the page is increased appropriately. By the same token, each time a block is reclaimed from a page, the percent of utilization of the page is decreased.

As mentioned, in the performance of the OTF compaction process of the invention, blocks are always allocated at the next available virtual address in a virtual address page. Any time a block is reclaimed, the location of the memory regions made available on the page is of no concern. Therefore, the only information which must be managed is that identifying which virtual address pages in each area are available for use by that area for allocation. To accomplish this, a linked list of available pages 20 is maintained. Any time the page at N becomes full, the list 20 is accessed, and a page removed from the list.

When an area is first created, all pages which make up the area would be entries in the list of available pages. It is desirable for the OTF compactor to advance through the virtual address space of the area one page at a time without backtracking to pages which become empty and are available for reuse. Assuming that garbage collection is not performed before or at the time the virtual address space of the area has been completely traversed, it may be desirable, when the highest-addressed page is finally used, to then pass through the virtual address space again. On these passes, only pages which are known to be empty (i.e:, their utilization is zero) are used. This process then continues through several passes, until garbage collection is invoked on the area.

In the case of requests to allocate blocks which are larger than a single page, it is necessary that the block occupies contiguous pages. There is little difficulty in meeting this requirement during the first traversal of the area's virtual address space, since consecutive pages exist side-by-side on the list of available pages, except when the last page of an area is encountered on the list. Then, the next page on the list has a virtual address non-contiguous to its predecessor. After the first pass through the area's virtual address space, there is no guarantee that two consecutive pages on the list would have consecutive virtual addresses. Thus, a check is necessary any time a multi-page block is allocated.

It will be appreciated that the number of physical pages is limited. Also, as pointer N advances, new physical pages are needed to allocate new blocks. Common schemes will page out an arbitrary page without regard to what exists on it. However, paging out pages which are not fully utilized, that is, pages whose percent of utilization may have decreased considerably, does not lead to efficient use of disk space. Moreover, it would be unfortunate to move active blocks to disk, since active blocks are better placed in virtual address pages which remain in physical memory.

As mentioned, in order to make efficient use of disk space, and to keep active blocks in physical memory, the method of the invention relocates the active blocks residing in sparsely utilized pages which have been or soon will be paged out to virtual pages which are in physical memory. The page at pointer N, where new blocks are allocated, is in physical memory and is a part of the dynamic working set. Therefore, it is an ideal place in which to relocate any active blocks which meet certain criteria.

The first criterion for the decision to relocate or "copy forward" an active block is that the block be referenced by the CPU. (Referencing a block is the only way to distinguish an active block from a stable block.) Secondly, the active block is not already located in the page at pointer N. (This second criterion implies that a block in the page at pointer N is not copied forward, since nothing would be gained.) A third criterion, which is related to use the backing store efficiently, is that the active block be located on a page whose percent of utilization has fallen below a certain threshold. A page which is being fully utilized should be left alone, since even if the page is in physical memory and must be paged out so that another page may be brought in, the fact that it is not sparse would make efficient use of disk space. Unfortunately, this would result in removing an active block (there may even be other active blocks in the same page) from the dynamic working set.

A fourth criterion could, therefore, prove useful. If the active block is located in a page which is sufficiently "old", as determined by a least recently used (LRU) implementation with minimal overhead, the block is copied forward regardless of the percent of utilization of the page. This would, in effect, keep the active block in the dynamic working set, and "set off" the reduction of the percent of utilization of the page, as well.

Relocating an active block is illustrated in FIG. 2, in which block B1 is accessed. Block B1 is not located in the page pointed to by N, but is located in a page which has a low utilization. Therefore, it will be copied forward to virtual address page 4 (as N advances). The old location of block B1 is appropriately updated to point to the copied block. Other blocks (not shown) referencing block B1 will still point to the old copy of block B1 (in virtual address page 1), so it will be necessary to leave a forward pointer at the old location of block B1. In similar fashion, as shown in FIG. 2, blocks B4, B6, B7, and B10 are copied forward as they are referenced to the location as pointer N advances.

If a block meets the above criteria and is to be copied forward, the reference count of the block is first checked. A reference count of one indicates that there are no references to the block other than the block cell which the CPU has used or perhaps a binding register (see copending patent application Ser. No. 636,187, filed July 31, 1984. Therefore, after copying the block and updating the object (cell or binding register) which referenced it so that it points to the new locations of the block, the original copy of the referenced block can be reclaimed. The percent of utilization of the page which contained the original copy of the block is then decremented.

If the reference count of the block copied forward is greater than one, it is also necessary to leave a forward reference at the location of the original copy of the block so that the other objects which reference the block can find the new location of the block. When the forward reference is first placed in the original location of the block, its reference count takes on the reference count of the original block minus on, since all other references to the block only know of the old location of the block, and are, therefore, actually referencing the forward reference. The copied block, in the new location, is given a reference count of two, one for the object which referenced the block to cause the copy forward, and one for the forward reference to the block. Later, when an object encounters a forward reference, the object is updated to point to the new location of the block, the forward's reference count is decremented by one to account for the loss of the object's reference, and the reference count of the block at the new location is incremented by one to account for the pointer from the object. If the reference count of a forward reference reaches zero, it can be reclaimed after the reference count of the block to which it points is decremented by one.

Figure 3:
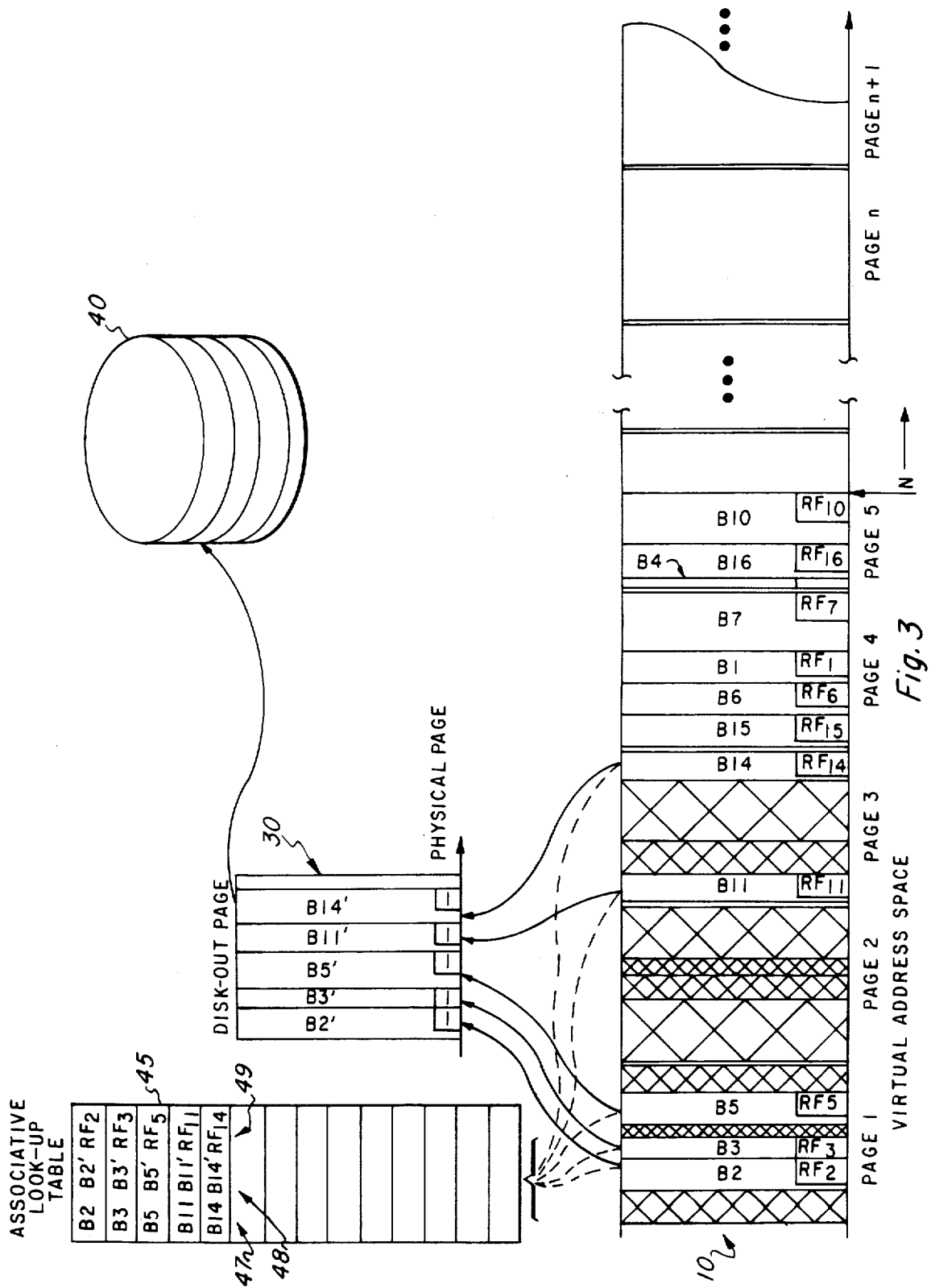
FIG. 3 is a diagrammatic illustration showing the virtual address space of an Area X of FIGS. 1 and 2 showing the manner by which static blocks on sparsely utilized pages are compacted, indexed, and written to disk of the virtual address space.
Figure 4:
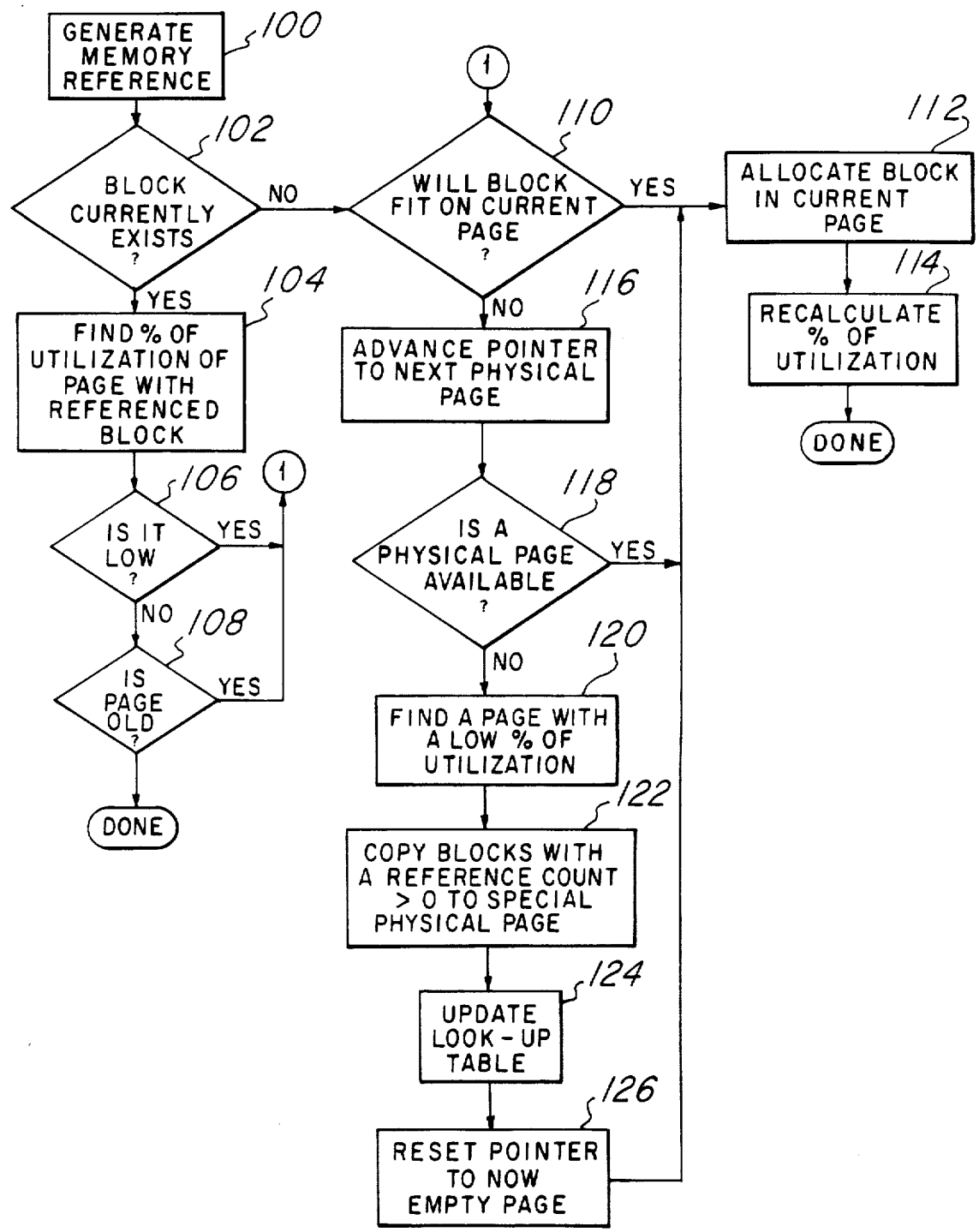
FIG. 4 is a flow chart illustrating the method of On-the-fly (OTF) compaction in accordance with the claimed invention.

As mentioned above, and with reference now to FIG. 3, it is not advantageous to page out pages which are sparsely utilized, since making efficient use of disk space is one of the major goals of the invention. Therefore, when such a page is about to be paged out, the few blocks remaining on the page are copied to another physical page used explicitly for that purpose. The page which was once sparsely utilized then becomes completely empty, nothing needs to be written to the disk, and the physical page can be immediately reused. Thus, as shown, pages 1 and 3 are sparsely utilized and can be copied out to a disk out page 30, whch in turn can be written out to a disk 40 or other backup store. Since it is not known where the references, if any, to the copied blocks originated, entries are made to an associative look-up table. (Although it may be simpler to place a forward reference to the new location of a copied block in the address where the block was originally located, this would defeat the purpose of copying the blocks, that is, to empty a page, since the forward reference would have to remain in the page.)

Each table entry includes the virtual address of the original location of the block 47, the virtual address of the new location of the block 48, and a count of the references to the original location of the block 49. The reference count in the table entry takes on the reference count of the block which is copied. The reference count of the copied block is changed to one (as shown), since the only reference to the block, for the time being, is the reference originating in the table entry.

In the process of removing the few remaining blocks on the page, a forward reference may be encountered. Since the block referred to by the forward reference had been copied at an earlier time, no block is copied to the "special" page. The forward reference cannot simply be forgotten, however. The information must be preserved in the table just as if the block were copied. As such, the forward reference remains intact, but takes on a new form.

When and if the CPU references a block whose virtual address does not exist in the page tables 20, that is, the address is not in physical memory or on disk 40, the disk maps, or other control directory, the address of the block may be found in the associative look-up table 45. The pointer held by the CPU or block cell which the CPU has used to reference the block can be updated to point to the new location of the block. The copied block then has an additional reference to it, so its reference count must be incremented. Also, the table entry has one less reference to it, so its reference count must be decremented. If this would make the reference count of the table entry equal to zero, the entry can be removed from the table, since there are no longer any references to it. Of course, since removal of the entry means that there is one less reference to the block it pointed to, the reference count of the block the entry pointed to would necessarily have to be decremented.

In an attempt to minimize the number of entries in the associative look-up table 45, it may be desirable to sweep the dynamic working set in search of references which appear in the table. This might occur when the processor is otherwise idle. When such a reference is found, the object containing the reference can be updated to refer to the true location of the block, and the reference count of the table entry can then be decremented. Should the reference count of the entry become zero, the entry can be removed from the table.

It is desirable to locate and remove garbage blocks whenever possible. Unfortunately, there is limited opportunity to discover such blocks. If, however, two or more blocks form a circular list, and all blocks of the list are contained in a single page, and all of the list have a reference count of one, such blocks are garbage blocks and may be detected during a sweep of a page. A page sweep could also locate a block whose only references originate in the block itself.

When the area is first given its portion of the virtual address space (VAS) for allocation, represented as a list of empty pages, these empty pages can be considered to form a large, contiguous fragment. Thus, whenever the page at pointer N becomes full, the next virtual address page is made available in physical memory and used for further allocation and copying forward. Until the highest virtual address page of the area is used for allocation and copying forward, there is no difficulty in determining which virtual address page will be used next.

It is not possible to simply have pointer N "wrap around" and point to the lowest virtual address page of the area, after the highest virtual address page becomes full, and continue "advancing" N through the VAS once again. Many of the pages may not be available for allocation. Obviously, a "stable" page, containing stable blocks and most likely residing on disk, cannot be reused without destroying useful information.

Similarly, a virtual address page having one or more virtual addresses which are still referenced, even though the page does not exist on disk or in physical memory, cannot be reused. This could occur when the blocks on a sparse page are copied to another page and the forwarding references are entered on the associative look-up table. The virtual address page where the copied blocks were originally located (before copying) is not backed up on disk, yet the virtual addresses corresponding to those blocks are still viable referenced addresses. The only means of detecting that the referenced addresses were forwarded via the look-up table is the fact that the virtual address page no longer exists on disk or in main memory. Allocating over the referenced virtual addresses would be catastrophic.

However, a large portion of the virtual address pages for the area may have been freed for reuse. If all the blocks on the page have been removed, either because their reference counts reached zero, or because they were copied forward without needing a forward reference, then the page becomes free once again. By placing the page on the list of empty pages 20, it can be used for allocation in the future. When pointer N fills the highest virtual address page, the virtual address pages on the list of empty pages, and only those pages, are used for allocation in further "passes" through the VAS.

Although the invention has been described and illustrated with a certain degree of particularity, it is understood that the steps and procedures set forth are by way of example only and that numerous changes in the combination and arrangement thereof may be resorted to by those skilled in the art without departing from the spirit and scope of the invention as hereinafter claimed.

What is claimed is:

1. A method for compacting blocks of memory in a demand paged virtual address space including a plurality of virtual address pages, comprising the steps of:
   (a) defining at least one pointer to indicate a page of said virtual memory space;
   (b) advancing said pointer to continually indicate the page at the beginning of available virtual memory space;
   (c) locating newly allocated blocks in the virtual address space beginning at a next available location on the page indicated by said advancing pointer;
   (d) moving previously allocated blocks to which a new reference is later made by the user to a next available location indicated by said advancing pointer.

2. The method of claim 1 further comprising the step of:
   (e) keeping track of the proportion of allocated space to deallocated space on each page, and executing step (d) only if such proportion falls below a predetermined level.

3. The method of claim 1 further comprising providing a disk memory, and paging out to said disk memory pages containing blocks which have not recently been allocated or reallocated.

4. The method of claim 2 further comprising providing means for making available for allocation pages from which all blocks have been moved and the proportion of allocated space to deallocated space is zero.

5. The method of claim 1 further comprising writing forward pointers into the location from which the blocks are moved in step (d), wherein the forward pointers reference the new locations of the blocks.

6. The method of claim 2 further comprising providing a page for receiving blocks from pages having a low proportion of allocated space to deallocated space, moving blocks from such pages onto said provided page, and moving said provided page onto a disk memory.

7. The method of claim 1 further comprising providing an associative look-up table, and writing into said table the current location of the blocks which are moved.

8. The method of claim 7 further providing means in said associative look-up table for maintaining a reference count for each block identified therein.

9. The method of claim 8 further comprising periodically updating the associative look-up table to update references to the blocks identified therein.

10. The method of claim 1 further comprising determining blocks with only self-referencing structures contained within a virtual address page and deallocating them.

11. A method for managing blocks of memory in a demand paged virtual address space including a plurality of virtual address pages, comprising:
   creating at least one pointer to advancingly indicate a next available virtual address page; and
   moving blocks of memory to which reference is made by the user to a current location of the pointer, whereby active blocks are collected together on active pages.

* * * * *